(12) United States Patent
Kim et al.

(10) Patent No.: US 11,603,481 B2
(45) Date of Patent: Mar. 14, 2023

(54) COMPOSITE MATERIAL

(71) Applicant: LG CHEM, LTD., Seoul (KR)

(72) Inventors: So Jin Kim, Daejeon (KR); Jong Min Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/647,885

(22) PCT Filed: Sep. 21, 2018

(86) PCT No.: PCT/KR2018/011299
§ 371 (c)(1),
(2) Date: Mar. 17, 2020

(87) PCT Pub. No.: WO2019/059730
PCT Pub. Date: Mar. 28, 2019

(65) Prior Publication Data
US 2020/0216715 A1    Jul. 9, 2020

(30) Foreign Application Priority Data
Sep. 22, 2017   (KR) .......................... 10-2017-0122574

(51) Int. Cl.
C09D 183/04      (2006.01)
C22C 1/08        (2006.01)
(Continued)

(52) U.S. Cl.
CPC ............. *C09D 183/04* (2013.01); *C09D 7/62* (2018.01); *C09D 7/69* (2018.01); *C09D 7/70* (2018.01); *C22C 1/08* (2013.01); *C22C 9/00* (2013.01)

(58) Field of Classification Search
CPC .......... C09D 183/04; C09D 7/69; C09D 7/70; C09D 7/62; C22C 9/00; C22C 1/08;
(Continued)

(56) References Cited

U.S. PATENT DOCUMENTS 6,929,866 B1 * 8/2005 Williams ................ C04B 41/87
428/307.7
2010/0197882 A1   8/2010 Imai et al.
(Continued)

FOREIGN PATENT DOCUMENTS

CN      102917574 A     2/2013
CN      104822476 A     8/2015
(Continued)

OTHER PUBLICATIONS

Chen L, Xu H-F, He S-J, Du Y-H, Yu N-J, Du X-Z, et al. (2017) Thermal Conductivity Performance of Polypropylene Composites Filled with Polydopamine-Functionalized Hexagonal Boron Nitride. PLoS ONE 12(1):e0170523. doi:10.1371/journal.pone.0170523 (Year: 2017).*
(Continued)

*Primary Examiner* — Michael Zhang
(74) *Attorney, Agent, or Firm* — Myers Bigel, P.A.

(57) ABSTRACT

The present application provides a composite material and a method for preparing the same. The present application can provide a composite material which comprises a metal foam and a polymer component and if necessary, further comprises a thermally conductive filler, and has other excellent physical properties such as impact resistance, processability and insulation properties while having excellent thermal conductivity.

16 Claims, 1 Drawing Sheet

(51) Int. Cl.
*C22C 9/00* (2006.01)
*C09D 7/40* (2018.01)
*C09D 7/62* (2018.01)

(58) Field of Classification Search
CPC   B32B 5/18; B32B 27/06; B32B 27/20; B32B 27/065; B32B 2307/302; B32B 2266/045
See application file for complete search history.

(56) References Cited

U.S. PATENT DOCUMENTS

| | | | | |
|---|---|---|---|---|
| 2011/0311767 | A1* | 12/2011 | Elahee | C08K 5/11 |
| | | | | 428/138 |
| 2014/0116661 | A1* | 5/2014 | Xu | G06F 1/20 |
| | | | | 165/133 |
| 2016/0107376 | A1 | 4/2016 | Nakajima et al. | |
| 2016/0264832 | A1 | 9/2016 | Yuan et al. | |
| 2020/0172764 | A1* | 6/2020 | Shin | B22F 7/004 |

FOREIGN PATENT DOCUMENTS

| | | | | | |
|---|---|---|---|---|---|
| CN | 105339166 | A | | 2/2016 | |
| EP | 3650511 | A2 | | 5/2020 | |
| EP | 3683045 | A1 | | 7/2020 | |
| JP | 2000101005 | | | 4/2000 | |
| JP | 2003080629 | A | | 3/2003 | |
| JP | 2008109111 | A | | 5/2008 | |
| JP | 2009094110 | A | | 4/2009 | |
| JP | 2010173274 | | | 8/2010 | |
| JP | 2012520375 | A | | 9/2012 | |
| JP | 2013120814 | A | | 6/2013 | |
| JP | 2014534645 | | | 12/2014 | |
| JP | 2016503575 | A | | 2/2016 | |
| JP | 2016184648 | A | * | 10/2016 | ........... H01L 23/373 |
| JP | 2017-028019 | | | 2/2017 | |
| JP | 2017107731 | A | | 6/2017 | |
| KR | 1020070079891 | | | 8/2007 | |
| KR | 10-20080028819 | A | | 4/2008 | |
| KR | 100969194 | | | 7/2010 | |
| KR | 1020100075227 | | | 7/2010 | |
| KR | 1020130068436 | | | 6/2013 | |
| KR | 101321099 | B1 | | 10/2013 | |
| KR | 101476744 | | | 12/2014 | |
| WO | WO-2014141071 | A1 | * | 9/2014 | ............... C25D 7/04 |
| WO | 2014/192718 | | | 12/2014 | |
| WO | 2015060125 | A1 | | 4/2015 | |

OTHER PUBLICATIONS

Espacenet Translation of JP2016184648A (Year: 2021).*
García-Moreno, Francisco. "Commercial applications of metal foams: Their properties and production." Materials 9.2 (2016): 85. (Year: 2016).*
Su, Yang, et al. "New aluminum foam/polyformaldehyde interpenetrating phase composites prepared by injection molding." Advanced Materials Research. vol. 631. Trans Tech Publications Ltd, 2013. (Year: 2013).*
Shin-Etsu Silicone, Silane Coupling Agents, Jun. 2017 (Year: 2017).*
Extended European Search Report corresponding to EP18857520.3; dated Aug. 18, 2020 (7 pages).
International Search Report corresponding to PCT/KR2018/011299, dated Jan. 2, 2019 (5 pp, including English translation).

* cited by examiner

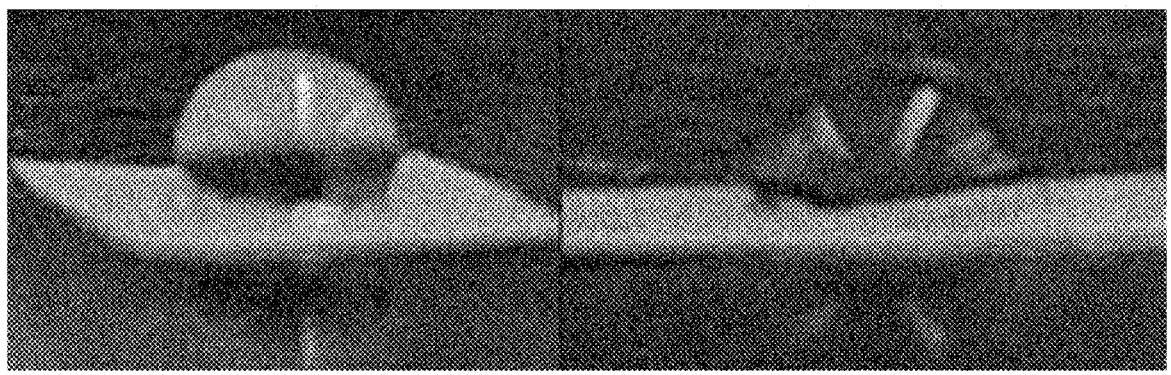

COMPOSITE MATERIAL

CROSS REFERENCE TO RELATED APPLICATIONS

This application is a 35 U.S.C. § 371 national stage application of PCT International Application No. PCT/KR2018/011299, filed Sep. 21, 2018, which claims priority from Korean Patent Application No. 10-2017-0122574, filed Sep. 22, 2017, the contents of which are incorporated herein in their entireties by reference. The above-referenced PCT International Application was published in the Korean language as International Publication No. WO 2019/059730 on Mar. 28, 2019.

TECHNICAL FIELD

The present application relates to a composite material.

BACKGROUND ART

Heat-dissipating materials can be used in various applications. For example, since batteries and various electronic apparatuses generate heat during operation, a material capable of effectively controlling such heat is required.

As materials having good heat dissipation properties, ceramic materials having good thermal conductivity and the like are known, but since such materials have poor processability, a composite material produced by blending the ceramic filler or the like exhibiting high thermal conductivity in a polymer matrix can be used.

However, since a large amount of filler components must be applied in order to secure high thermal conductivity by the above method, various problems arise. For example, in the case of a material containing a large amount of filler components, the material itself tends to become hard, and in such a case, impact resistance or the like is deteriorated.

DISCLOSURE

Technical Problem

The present application relates to a composite material and in one example, it is intended to provide a composite material ensuring other excellent physical properties such as impact resistance and processability while having excellent thermal conductivity, or a method for producing the same.

Technical Solution

The present application relates to a composite material. In the present application, the term composite material may mean a material comprising at least a metal foam and a polymer component.

In this specification, the term metal foam or metal skeleton means a porous structure comprising a metal or a metal alloy as a main component. Here, the fact that a metal or the like uses as a main component means that the ratio of the metal or the like is 55 weight % or more, 60 weight % or more, 65 weight % or more, 70 weight % or more, 75 weight % or more, 80 weight % or more, 85 weight % or more, 90 weight % or more, or 95 weight % or more based on the total weight of the metal foam or the metal skeleton. The upper limit of the ratio of the metal or the like contained as the main component is not particularly limited, and for example, may be 100 weight %, 99 weight % or 98 weight % or so.

In this specification, the term porous property may mean a case where porosity is at least 10% or more, 20% or more, 30% or more, 40% or more, 50% or more, 60% or more, 70% or more, 75% or more, or 80% or more. The upper limit of the porosity is not particularly limited, and may be, for example, less than about 100%, about 99% or less, or about 98% or less or so. The porosity can be calculated in a known manner by calculating the density of the metal foam or the like.

The composite material has high thermal conductivity, and accordingly, it can be used as a material for controlling heat, such as a heat-dissipating material.

For example, the composite may have thermal conductivity of about 1.5 W/mK or more, 2 W/mK or more, 2.5 W/mK or more, or 3 W/mK or more. The higher the thermal conductivity of the composite material, the composite material may have more excellent thermal control functions, which is not particularly limited, and in one example, it may be about 10 W/mK or less, 9 W/mK or less, 8 W/mK or less, 7 W/mK or less, 6 W/mK or less, 5 W/mK or less, or 4 W/mK or less.

The thermal conductivity of the composite material can be evaluated by the method described in examples to be described below.

Among physical properties mentioned in this specification, when the measured temperature affects relevant physical properties, the physical properties are physical properties measured at room temperature, unless otherwise specified. The term room temperature is a natural temperature without being heated or cooled, which may be, for example, any temperature in a range of 10° C. to 30° C., or a temperature of about 23° C. or about 25° C. or so.

While the composite material of the present application has excellent heat conduction properties as above, other properties such as processability and impact resistance can be stably secured, and such effects can be achieved by the contents described in this specification.

The shape of the metal foam contained in the composite material is not particularly limited, but may be a film shape in one example. In the composite material of the present application, a polymer component existing at least on the surface or in the interior of the metal foam in the film form is added.

Such a polymer component may form a surface layer on at least one surface of the metal foam, or may be filled and present in the voids inside the metal foam, and in some cases, it may also be filled into the metal foam while forming the surface layer. In the case of forming a surface layer, the polymer component may form the surface layer on at least one surface, some surfaces, or all surfaces among surfaces of the metal foam. In one example, the polymer component may form the surface layer on at least the upper and/or lower surfaces, which are the main surfaces of the metal foam. The surface layer may be formed to cover the entire surface of the metal foam, or may also be formed to cover only a part of the surface.

The metal foam in the composite material may have porosity in a range of about 10% to 99%. The metal foam having this porosity has a porous metal framework forming a suitable heat transfer network, and thus it can ensure excellent thermal conductivity even if a small amount of the relevant metal foam is applied. In another example, the porosity may be 15% or more, 20% or more, 25% or more, 30% or more, 35% or more, 40% or more, 45% or more, or 50% or more, or may be 98% or less.

As described above, the metal foam may be in the form of a film. In this case, the thickness of the film can be adjusted in consideration of the desired thermal conductivity or thickness ratio, and the like, in manufacturing a composite material according to a method to be described below. In order to ensure the target thermal conductivity, the thickness of the film may be, for example, about 40 μm or more, about 45 μm or more, about 50 μm or more, about 55 μm or more, about 60 μm or more, about 65 μm or more, or about 70 μm or more. The upper limit of the thickness of the film is controlled according to the purpose, which is not particularly limited, but may be, for example, about 1,000 μm or less, about 900 μm or less, about 800 μm or less, about 700 μm or less, about 600 μm or less, about 500 μm or less, about 400 μm or less, about 300 μm or less, about 200 μm or less, or about 150 μm or less or so.

In this specification, when the thickness of the relevant target is not constant, the thickness may be a minimum thickness, a maximum thickness or an average thickness of the target.

The metal foam may be a material having high thermal conductivity. In one example, the metal foam may comprise a metal or a metal alloy having thermal conductivity of about 8 W/mK or more, about 10 W/mK or more, about 15 W/mK or more, about 20 W/mK or more, about 25 W/mK or more, about 30 W/mK or more, about 35 W/mK or more, about 40 W/mK or more, about 45 W/mK or more, about 50 W/mK or more, about 55 W/mK or more, about 60 W/mK or more, about 65 W/mK or more, about 70 W/mK or more, about 75 W/mK or more, about 80 W/mK or more, about 85 W/mK or more, or about 90 W/mK or more, or may consist of such a metal or metal alloy. The thermal conductivity of the material of the metal foam is not particularly limited, which may be, for example, about 1,000 W/mK or less or so, because the higher the numerical value, the desired thermal control characteristics can be ensured while applying a small amount of the metal foam.

The skeleton of the metal foam may be composed of various kinds of metals or metal alloys, where a material capable of exhibiting thermal conductivity in the above-mentioned range when the metal foam has been formed may be selected from these metals or metal alloys. Such a material can be exemplified by any metal selected from the group consisting of copper, gold, silver, aluminum, nickel, iron, cobalt, magnesium, molybdenum, tungsten and zinc, or an alloy of two or more thereof, and the like, but is not limited thereto.

Such metal foams are variously known, and also various methods for preparing metal foams are variously known. In the present application, such known metal foams or metal foams prepared by the known methods can be applied.

As a method for preparing a metal foam, a method of sintering a pore-forming agent such as a salt and a composite material of a metal, a method of coating a metal on a support such as a polymer foam and sintering it in this state or a slurry method, and the like is known. Furthermore, the metal foam can also be prepared by a method disclosed in Korean Patent Application No. 2017-0086014, 2017-0040971, 2017-0040972, 2016-0162154, 2016-0162153 or 2016-0162152, and the like, which is a prior application of the present applicant.

The metal foam may also be prepared by the induction heating method from the methods described in the prior applications, where the metal foam may comprise at least a conductive magnetic metal. In this case, the metal foam may comprise 30 weight % or more, 35 weight % or more, 40 weight % or more, 45 weight % or more, or 50 weight % or more of the conductive magnetic metal on the basis of weight. In another example, the ratio of the conductive magnetic metal in the metal foam may be about 55 weight % or more, 60 weight % or more, 65 weight % or more, 70 weight % or more, 75 weight % or more, 80 weight % or more, 85 weight % or more, or 90 weight % or more. The upper limit of the ratio of the conductive magnetic metal is not particularly limited, and may be, for example, less than about 100 weight % or 95 weight % or less.

In the present application, the term conductive magnetic metal is a metal having predetermined relative magnetic permeability and conductivity, which may mean a metal capable of generating heat to such an extent that the metal can be sintered by the induction heating method.

In one example, as the conductive metal, a metal having relative magnetic permeability of 90 or more may be used. The relative magnetic permeability ($\mu_r$) is a ratio ($\mu/\mu_0$) of the magnetic permeability ($\mu$) of the relevant material to the magnetic permeability ($\mu_0$) in the vacuum. In another example, the relative magnetic permeability may be 95 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, 350 or more, 360 or more, 370 or more, 380 or more, 390 or more, 400 or more, 410 or more, 420 or more, 430 or more, 440 or more, 450 or more, 460 or more, 470 or more, 480 or more, 490 or more, 500 or more, 510 or more, 520 or more, 530 or more, 540 or more, 550 or more, 560 or more, 570 or more, 580 or more, or 590 or more. The higher the relative magnetic permeability is, the higher the heat is generated at the time of application of the electromagnetic field for induction heating which is described below, whereby the upper limit is not particularly limited. In one example, the upper limit of the relative magnetic permeability may be, for example, about 300,000 or less.

The conductive magnetic metal may have conductivity at 20° C. of about 8 MS/m or more, 9 MS/m or more, 10 MS/m or more, 11 MS/m or more, 12 MS/m or more, 13 MS/m or more, or 14.5 MS/m or more. The upper limit of the conductivity is not particularly limited, and for example, the conductivity may be about 30 MS/m or less, 25 MS/m or less, or 20 MS/m or less.

A specific example of such a conductive magnetic metal includes nickel, iron or cobalt, and the like, but is not limited thereto.

In one example, various functional groups may be introduced into the metal foam. The functional group may be selected so that the metal foam may exhibit appropriate compatibility with the polymer component. In the industry, depending on the kind of the polymer component, various functional groups that can ensure the compatibility therewith are known, and thus a suitable functional group may be selected according to the kind of the polymer component used in the present application. Such a functional group can be exemplified by an amino group, a hydroxyl group, an alkoxy group, a carboxyl group, a glycidyl group and/or a sulfonyl group, and the like, but is not limited thereto. Here, the alkoxy group may be an alkoxyl group having 1 to 20 carbon atoms, 1 to 16 carbon atoms, 1 to 12 carbon atoms, 1 to 8 carbon atoms, or 1 to 4 carbon atoms. The method of introducing such a functional group into the metal foam is not particularly limited. For example, a method of introducing the above-mentioned functional group into a metal material is variously known, and in the present application, these known methods can all be applied.

For example, the functional group can be introduced by contacting a metal foam with a silane compound containing the relevant functional group.

Here, an example of the silane compound can be exemplified by a compound represented by Formula 1 below, but is not limited thereto.

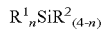
[Formula 1]

In Formula 1, $R^1$ is a hydroxyl group, an amino group, an alkoxy group, a carboxyl group, a glycidyl group or a sulfonyl group, or a functional group containing the foregoing, $R^2$ is a hydrogen atom, an alkyl group or an alkoxy group, n is a number in a range of 1 to 4.

Here, the functional group containing a hydroxyl group, an amino group, an alkoxy group, a carboxyl group, a glycidyl group or a sulfonyl group can be exemplified by an aminoalkyl group, an alkoxyalkyl group, a carboxyalkyl group, a glycidyloxy group, a glycidylalkyloxy group or an alkylsulfonyl group, but is not limited thereto.

Here, the alkyl group may be an alkyl group having 1 to 20 carbon atoms, 1 to 16 carbon atoms, 1 to 12 carbon atoms, 1 to 8 carbon atoms or 1 to 4 carbon atoms, which may be branched, linear or cyclic, and may be optionally substituted with one or more substituents.

Also, here, as the alkoxy group, an alkoxy group having 1 to 20 carbon atoms, 1 to 16 carbon atoms, 1 to 12 carbon atoms, 1 to 8 carbon atoms or 1 to 4 carbon atoms may be applied, which may be branched, linear or cyclic, and may be optionally substituted with one or more substituents.

In one example, the desired functional group may be introduced by contacting a metal foam with the silane compound, or the desired functional group may also be introduced by a method of once introducing the silane compound into a metal foam and then reacting the functional group thus introduced with another compound.

In addition, if necessary, a pretreatment process of removing oxide components present in the metal foam, and the like through acid treatment or the like may also be performed before contact with the silane compound.

The metal foam may also comprise a metal oxide in an amount of about 30 weight % or less, 25 weight % or less, 20 weight % or less, 15 weight % or less, 10 weight % or less, 5 weight % or less, 1 weight % or less, or 0.5 weight % or less, and suitably, substantially 0 weight %. That is, when the metal foam is oxidized through contact with air, or the like to form an oxide, the thermal conductivity of the metal foam itself is greatly deteriorated, and thus, it is advantageous to apply a metal foam with little, if possible, or no metal oxide. The method for removing the metal oxide from the metal foam is not particularly limited, and for example, a method of holding the metal foam in an acidic solution such as HCl or $HNO_3$ can be used.

The composite material further comprises a polymer component present on the surface of the metal foam or in the interior of the metal foam, as described above, wherein the ratio (T/MT) of the total thickness (T) of such a composite material to the thickness (MT) of the metal foam may be 2.5 or less. In another example, the thickness ratio may be about 2 or less, 1.5 or less, 1.4 or less, 1.3 or less, 1.2 or less, 1.15 or less, or 1.1 or less. The lower limit of the thickness ratio is not particularly limited, but in one example, it may be about 1 or more, about 1.01 or more, about 1.02 or more, about 1.03 or more, about 1.04 or more, or about 1.05 or more. Under such a thickness ratio, it is possible to provide a composite material having excellent processability or impact resistance, and the like, while ensuring the desired thermal conductivity.

The kind of the polymer component included in the composite material of the present application is not particularly limited, which may be selected in consideration of, for example, processability, impact resistance, insulation properties or the like of the composite material. An example of the polymer component applicable in the present application may include one or more selected from the group consisting of known acrylic resins, silicone resins, epoxy resins, urethane resins, amino resins, polyester resins, olefin resins and phenol resins, but is not limited thereto.

In the case of the composite material, it is possible to secure excellent thermal conductivity while minimizing the ratio of components securing the thermal conductivity mainly through the application of the above-described metal foam, thereby securing the desired physical properties without damaging processability or impact resistance, and the like.

In one example, the ratio (MV/PV) of the volume (PV) of the polymer component and the volume (MV) of the metal foam contained in the composite material may be 0.5 or less. In another example, the ratio (MV/PV) may be 9 or less, 8 or less, 7 or less, 6 or less, 5 or less, 4 or less, 3 or less, 2 or less, 1 or less, or 0.5 or less or so. The lower limit of the volume ratio is not particularly limited, which may be, for example, about 0.1 or so. The volume ratio can be calculated through the weight of the polymer component and the metal foam, included in the composite material, and the density of the relevant components.

In the composite material of the present invention, such a polymer component forms a surface layer on at least one surface of the metal foam, where a thermally conductive filler is contained in the surface layer. Through this, it is possible to provide a composite material having better heat conduction characteristics.

The term thermally conductive filler in the present application means a filler having thermal conductivity of about 1 W/mK or more, about 5 W/mK or more, about 10 W/mK or more, or about 15 W/mK or more. The thermal conductivity of the thermally conductive filler may be about 400 W/mK or less, about 350 W/mK or less, or about 300 W/mK or less. The kind of the thermally conductive filler is not particularly limited, and for example, a ceramic filler or a carbon filler, and the like can be applied. Such a filler can be exemplified by alumina, AlN (aluminum nitride), BN (boron nitride), silicon nitride, SiC or BeO, and the like, or a filler such as carbon nanotube, carbon black, graphene, graphene oxide or graphite, but is not limited thereto.

The shape or ratio of the filler included in the surface layer is not particularly limited. In one example, the shape of the filler may have various shapes such as a substantially spherical shape, a needle shape, a plate shape, a dendritic shape or a star shape.

In one example, the thermally conductive filler may have an average particle diameter in a range of 0.001 μm to 80 μm. In another example, the average particle diameter of the filler may be 0.01 μm or more, 0.1 or more, 0.5 μm or more, 1 μm or more, 2 μm or more, 3 μm or more, 4 μm or more, 5 μm or more, or about 6 μm or more. In another example, the average particle diameter of the filler may be about 75 μm or less, about 70 μm or less, about 65 μm or less, about 60 μm or less, about 55 μm or less, about 50 μm or less, about 45 μm or less, about 40 μm or less, about 35 μm or less, about 30 μm or less, about 25 μm or less, about 20 μm or less, about 15 μm or less, about 10 μm or less, or about 5 μm or less.

Various functional groups that can be introduced into the metal foam, as described above, that is, functional groups capable of improving compatibility with the polymer component can also be introduced into the filler. Such a functional group can be exemplified by the amino group, the hydroxyl group, the alkoxy group, the carboxyl group, the glycidyl group and/or the sulfonyl group, and the like, as described above, but is not limited thereto. Here, the alkoxy group may be an alkoxy group having 1 to 20 carbon atoms, 1 to 16 carbon atoms, 1 to 12 carbon atoms, 1 to 8 carbon atoms, or 1 to 4 carbon atoms. The method of introducing such a functional group into the filler is not particularly limited. For example, the method of introducing the above-mentioned functional group into the filler is variously known in the literature including Polym. Adv. Technol. 2014. 25 791-798, etc., and in the present application, these known methods can all be applied.

For example, in the case of a BN (boron nitride) filler, the amine group present on the surface thereof may be substituted with a hydroxyl group through treatment with an NaOH solution, and the functional group may be introduced again through an amino-silane reaction or the like.

The ratio of the filler can be adjusted within the range in which the desired properties are secured or undamaged. In one example, the filler may be included in the composite material in a volume ratio of about 80 vol % or less. Here, the volume ratio is a value calculated based on the weight and density of each of the components constituting the composite material, for example, the metal foam, the polymer component and the filler.

In another example, the volume ratio may be about 75 vol % or less, 70 vol % or less, 65 vol % or less, 60 vol % or less, 55 vol % or less, 50 vol % or less, 45 vol % or less, 40 vol % or less, 35 vol % or less, or about 30 vol % or less or so, or may be about 1 vol % or more, 2 vol % or more, 3 vol % or more, 4 vol % or more, or about 5 vol % or more or so.

The present application also relates to a method for preparing a composite material in the form as above. The method may comprise a step of curing a curable polymer composition comprising a thermally conductive filler in a state where the polymer composition is present on the surface of a metal foam having thermal conductivity of 8 W/mK or more and being in the form of a film.

The details of the metal foam or filler applied in the method are as described above, and specific matters of the composite material to be prepared may also follow the contents as described above.

On the other hand, the polymer composition applied in the above is not particularly limited as long as it can form the above-mentioned polymer component through curing or the like, and such polymer components are variously known in the art.

That is, for example, the composite material can be prepared by performing the curing through a known method using a material having appropriate viscosity among known components.

Advantageous Effects

The present application can provide a composite material which comprises a metal foam, a polymer component and a thermally conductive filler, and has other excellent physical properties such as impact resistance, processability and insulation properties while having excellent thermal conductivity.

BRIEF DESCRIPTION OF DRAWINGS

FIG. 1 is photographs for confirming the contact angle of the copper metal foam before and after surface treatment.

MODE FOR INVENTION

Hereinafter, the present application will be described in detail by way of examples and comparative examples, but the scope of the present application is not limited to the following examples.

Example 1

Metal Foam Surface Treatment

The metal foam was a copper metal foam, where the copper metal foam in a film shape with a thickness of about 70 μm or so, porosity of about 70% and thermal conductivity of about 6.616 W/mK or so was used. The copper metal foam was immersed in a 10% $HNO_3$ solution for about 10 minutes or so to remove an oxide film capable of existing on the surface. Subsequently, the copper metal foam was immersed in a 3-aminopropyltriethoxysilane solution (3 weight %) at room temperature for 1 hour or so to introduce an amino group to the surface. FIG. 1 is a view for confirming the contact angle of the copper metal foam to confirm whether or not an amino group is introduced on the surface thereof, where the left side is a photograph before introduction treatment and the right side is a photograph after introduction treatment. From the drawing, it can be confirmed that the hydrophilicity increases after the surface treatment. As a result of measuring the thermal conductivity of the metal foam, it was confirmed to be about 10.649 W/mK, whereby it can be confirmed that the thermal conductivity has been improved through the surface treatment.

Here, the thermal conductivity was determined by obtaining the thermal diffusivity (A), specific heat (B) and density (C) and substituting them into an equation of thermal conductivity=ABC, where the thermal diffusivity was measured with a laser flash method (LFA equipment, model name: LFA467), the specific heat was measured by way of DSC (differential scanning calorimeter) equipment and the density was measured with Archimedes method. Also, the thermal conductivity is a value with respect to the thickness direction (Z axis) of the composite material.

Surface Treatment of Thermally Conductive Filler

As the thermally conductive filler, plate-shaped boron nitride powder (flake type, average diameter: about 10 μm, thickness about 1 μm) was applied to the surface treatment. First, the powder was immersed in a NaOH solution at a temperature of about 90° C. for about 12 hours to introduce a hydroxyl group onto the surface. Then, it was immersed again in a solution of 3-aminopropyltriethoxysilane (3 weight %) at a temperature of about 90° C. for about 12 hours or so to introduce an amino group onto the surface.

Table 1 below is the elemental analysis results performed on the boron nitride powder before and after the surface treatment using SEM equipment (Hitachi S-4800 model with ESD equipment from Oxford added). From Table 1 below, it can be confirmed that silicon atoms have been confirmed after the surface treatment, and thus amino groups have been introduced.

TABLE 1

|  | Before surface treatment | | After surface treatment | |
| --- | --- | --- | --- | --- |
|  | Weight % | Atomic % | Weight % | Atomic % |
| B K | 44.57 | 51.02 | 44.48 | 51.07 |
| N K | 55.43 | 48.98 | 53.71 | 47.59 |
| O K | — | — | 1.60 | 1.24 |
| Si K | — | — | 0.22 | 0.10 |

Preparation of Composite Material

The copper metal foam was impregnated with a thermosetting silicone composition (PDMS, Sylgard 183 kit) containing the surface-treated boron nitride powder in a ratio of about 10 weight % or so, and an excess of composition was removed using an applicator so that the thickness of the final composite material was about 120 μm or so. Subsequently, the material was maintained in an oven at about 120° C. for about 10 minutes or so and cured to prepare a composite material. As a result of measuring the thermal conductivity of the prepared composite material, it was confirmed to be about 3.008 W/mK or so.

Here, the thermal conductivity was determined by obtaining the thermal diffusivity (A), specific heat (B) and density (C) and substituting them into an equation of thermal conductivity=ABC, where the thermal diffusivity was measured with a laser flash method (LFA equipment, model name: LFA467), the specific heat was measured by way of DSC (differential scanning calorimeter) equipment and the density was measured with Archimedes method. Also, the thermal conductivity is a value with respect to the thickness direction (Z axis) of the composite material.

Comparative Example 1

A composite material was prepared in the same manner as in Example 1, except that the copper metal foam and the boron nitride before the surface treatment were used, and as a result of measuring the thermal conductivity of the composite material in the same manner, it was about 2.550 W/mK or so.

What is claimed is:

1. A composite material comprising:
a metal foam, wherein the metal foam is in the form of a film and comprises one or more functional groups selected from the group consisting of a hydroxyl group, an amino group, an alkoxy group, a carboxyl group, a glycidyl group and a sulfonyl group; and
a polymer,
wherein the polymer is present in an interior of the metal foam or is present both in the interior and on a surface of the metal foam,
wherein a volume (MV) of the metal foam is at most 9 times a volume (PV) of the polymer,
wherein the metal foam has a thickness of 1,000 μm or less,
wherein the polymer comprises one or more selected from the group consisting of an acrylic resin, a silicone resin, an epoxy resin, a urethane resin, an amino resin, a polyester, an olefin resin and a phenol resin,
wherein an amount of a metal oxide in the metal foam is substantially zero weight %,
wherein the polymer comprises a thermally conductive filler,
wherein the thermally conductive filler has a needle shape, a plate shape, a dendritic shape, a star shape, or a flake shape,
wherein the thermally conductive filler comprises one or more functional groups selected from the group consisting of a hydroxyl group, an amino group, an alkoxy group, a carboxyl group, a glycidyl group and a sulfonyl group,
wherein a volume of the thermally conductive filler is at most 30 vol % of the composite material, and
wherein the thermally conductive filler and the metal foam each comprises the same functional group.

2. The composite material according to claim 1, wherein a total thickness (T) of the composite material is at most 2.5 times the thickness of the metal foam.

3. The composite material according to claim 1, wherein the metal foam comprises a metal having a thermal conductivity of at least 8 W/mK.

4. The composite material according to claim 1, wherein the thickness of the metal foam is at least 40 μm.

5. The composite material according to claim 1, wherein the metal foam has a porosity in a range of from 10 to 99%.

6. The composite material according to claim 1, wherein the metal foam has a skeleton comprising a metal selected from the group consisting of copper, gold, silver, aluminum, nickel, iron, cobalt, magnesium, molybdenum, tungsten, zinc, and combinations of two or more thereof.

7. The composite material according to claim 1, wherein the volume (MV) of the metal foam is at most 0.5 times the volume (PV) of the polymer.

8. The composite material according to claim 1, wherein the polymer forms a surface layer on the surface of the metal foam, which surface layer comprises the thermally conductive filler.

9. The composite material according to claim 1, wherein the thermally conductive filler is a ceramic filler or a carbon filler.

10. The composite material according to claim 1, wherein the thermally conductive filler is alumina, aluminum nitride (AlN), boron nitride (BN), silicon nitride, SiC, BeO, carbon black, graphene, graphene oxide or graphite.

11. The composite material according to claim 1, wherein the thermally conductive filler has an average particle diameter in a range of from 0.001 μm to 80 μm.

12. The composite material according to claim 1, wherein the functional group applied to the metal foam is derived from a silane compound of Formula 1:

$$R^1{}_n SiR^2{}_{(4-n)} \quad \text{[Formula 1]}$$

wherein $R^1$ is a hydroxyl group, an amino group, an alkoxy group, a carboxyl group, a glycidyl group or a sulfonyl group, or a functional group containing the foregoing, $R^2$ is a hydrogen atom, an alkyl group or an alkoxy group, and n is a number in a range of from 1 to 4.

13. A method for preparing the composite material of claim 1, the method comprising:
curing a curable polymer composition formed on the surface or both on the surface and in the interior of the metal foam,
wherein the metal foam is in the form of a film,
and wherein the method further comprises removing oxide in the metal foam so that the amount of metal oxide in the metal foam is substantially zero weight %.

14. The method claim according to claim 13, further comprising adding the at least one functional group to the metal foam, wherein the at least one functional group comprises a hydroxyl group, an amino group, an alkoxy group, a carboxyl group, a glycidyl group, a sulfonyl group, or a combination of two or more thereof.

15. The method according to claim 14, wherein adding the at least one functional group to the metal foam comprises contacting the metal foam with a silane compound comprising the at least one functional group.

16. The method according to claim 14, further comprising removing metal oxide in the metal foam before adding the at least one functional group to the metal foam.

\* \* \* \* \*